United States Patent
Sakai et al.

(10) Patent No.: US 8,404,393 B2
(45) Date of Patent: Mar. 26, 2013

(54) LIQUID FUEL CELL SYSTEM AND BOOSTING UNIT OF THE SAME

(75) Inventors: Hirotaka Sakai, Kawasaki (JP); Nobuo Shibuya, Hiratsuka (JP); Hiroyuki Hasebe, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1602 days.

(21) Appl. No.: 11/328,131

(22) Filed: Jan. 10, 2006

(65) Prior Publication Data
US 2006/0115698 A1 Jun. 1, 2006

Related U.S. Application Data

(63) Continuation of application No. PCT/JP2004/010522, filed on Jul. 16, 2004.

(30) Foreign Application Priority Data

Jul. 16, 2003 (JP) ................................. 2003-197795

(51) Int. Cl.
*H01M 8/04* (2006.01)
(52) U.S. Cl. ........................................ 429/432; 429/428
(58) Field of Classification Search .................. None
See application file for complete search history.

(56) References Cited

U.S. PATENT DOCUMENTS

| 5,334,463 | A | 8/1994 | Tajima et al. |
| 5,714,874 | A * | 2/1998 | Bonnefoy ...................... 323/299 |
| 6,428,917 | B1 * | 8/2002 | Lacy et al. ...................... 429/13 |
| 6,590,370 | B1 | 7/2003 | Leach |

FOREIGN PATENT DOCUMENTS

| GB | 2 281 642 A | 3/1995 |
| JP | 60-30062 | 2/1985 |
| JP | 7-15653 | 2/1995 |
| JP | 7-153474 | 6/1995 |
| JP | 2002-44807 | 2/2002 |
| JP | 2003-178786 | 6/2003 |

* cited by examiner

*Primary Examiner* — Maria J Laios
(74) *Attorney, Agent, or Firm* — Oblon, Spivak, McClelland, Maier & Neustadt, L.L.P.

(57) ABSTRACT

A liquid fuel cell unit which outputs a first voltage, a boosting circuit which boosts the first voltage output from the liquid fuel cell unit, and outputs a boosted second voltage to an electronic apparatus, and a first control circuit are included. The first control circuit compares the first voltage output from the liquid fuel cell unit with a preset first threshold voltage, and controls the boosting circuit in accordance with the comparison result such that the first voltage does not fall below the first threshold voltage, or the first voltage holds the first threshold voltage or more.

12 Claims, 6 Drawing Sheets

LIQUID FUEL CELL SYSTEM AND BOOSTING UNIT OF THE SAME

CROSS-REFERENCE TO RELATED APPLICATIONS

This is a Continuation Application of PCT Application No. PCT/JP2004/010522, filed Jul. 16, 2004, which was published under PCT Article 21(2) in Japanese.

This application is based upon and claims the benefit of priority from prior Japanese Patent Application No. 2003-197795, filed Jul. 16, 2003, the entire contents of which are incorporated herein by reference.

BACKGROUND OF THE INVENTION

1. Field of the Invention

The present invention relates to a liquid fuel cell system and, more particularly, to a liquid fuel cell system used as a power supply of an electronic apparatus having a load which fluctuates with time, and a boosting unit of the same.

2. Description of the Related Art

Recently, a liquid fuel cell system which generates electric power by directly extracting protons from liquid fuel such as methanol or ethanol has been developed. Fuel cells of this type require only small fuel volumes because no modifier is necessary, so they are expected as power supplies of portable electronic apparatuses such as portable personal computers, personal digital assistants (PDAs), and video/audio players.

The electromotive force of one stack of a liquid fuel cell system such as a direct methanol fuel cell (DMFC) is small. To use this liquid fuel cell system as a power supply of a portable electronic apparatus, therefore, it is necessary to stack a large number of stacks in series or to boost the output voltage. If a large number of stacks are stacked in series, the size of the system increases. Accordingly, the use of a boosting circuit such as a DC-DC converter is generally being studied.

Unfortunately, the internal resistance of a fuel cell itself is high in the liquid fuel cell system. Therefore, when the liquid fuel cell system is used as a power supply of a portable electronic apparatus having a load which fluctuates with time, the output voltage of a fuel cell significantly lowers owing to the operation of a boosting circuit if the load increases. In some cases, the fuel cell shuts down.

On the other hand, an automobile fuel cell system having a function of preventing excess power supply has been proposed in order to control load fluctuations. As disclosed in, e.g., Jpn. Pat. Appln. KOKAI Publication No. 2002-44807, this system uses a hybrid power supply method which combines a fuel cell and secondary battery. If the output of the fuel cell exceeds a predetermined allowable value, an output command signal value of a DC/DC converter is decreased in accordance with the load increase. This prevents excess power supply exceeding the rated output from the fuel cell to the load.

In the conventionally proposed system described above, it is possible to prevent excess power supply exceeding the rated output from the fuel cell to the load. However, in a region below the rated output, the output of the fuel cell still fluctuates in accordance with the fluctuation in load. Accordingly, the inconvenience that the fuel cell shuts down is not eliminated, and this decreases the stability and power generation efficiency of power supply.

It is an object of the present invention to provide a liquid fuel cell system always capable of stable power supply against load fluctuations, and also capable of holding a high power generation efficiency, and a boosting unit of the same.

BRIEF SUMMARY OF THE INVENTION

To achieve the above object, a mode of the present invention comprises a liquid fuel cell unit which outputs a first voltage, a boosting circuit which boosts the first voltage output from the liquid fuel cell unit, and supplies a boosted second voltage to an electronic apparatus having a load which fluctuates with time, and a first control circuit. The first control circuit compares the first voltage output from the liquid fuel cell unit with a preset first threshold voltage, and controls the boosting circuit in accordance with the comparison result so as to suppress a change in the first voltage.

Boosting circuit control modes of the first control circuit include a mode in which the boosting circuit is controlled in accordance with the comparison result so that the first voltage does not fall below the first threshold voltage, and a mode in which the boosting circuit is controlled in accordance with the comparison result so that the first voltage holds the first threshold voltage or more.

DETAILED DESCRIPTION OF THE INVENTION

First, an outline of an embodiment of the present invention will be explained below.

In an aspect of the present invention, a boosting control circuit compares a first voltage output from a liquid fuel cell unit with a first threshold voltage. In accordance with the comparison result, a boosting operation of the boosting circuit is so controlled that the first voltage does not fall below the threshold voltage, or the first voltage holds the threshold voltage or more.

In the aspect of the present invention, therefore, when the boosting circuit so operates as to change a voltage supplied to a load in accordance with the fluctuation in load, the boosting operation of the boosting circuit is controlled by the boosting control circuit such that the first voltage does not fall below the threshold voltage. That is, even when the load fluctuates with time, the output voltage of a liquid fuel activation unit is always held equal to or higher than the threshold voltage. This makes it possible to prevent the inconvenience that the liquid fuel cell shuts down, thereby stably supplying electric power to an electronic apparatus.

The threshold value is preferably set between a first voltage value obtained when the electric power generated by the liquid fuel cell unit shows a peak value, and a value equivalent to 70% of the first voltage value. In this way, the liquid fuel cell unit can be operated in a high-efficiency region.

In addition, it is favorable to use a correction circuit for the threshold value, and allow this correction circuit to detect the temperature of the liquid fuel cell unit, and correct the threshold value in accordance with the detected temperature. With this arrangement, an optimum threshold value can be variably set whenever the temperature of the liquid fuel cell unit changes. When compared to a case in which the threshold voltage is fixed at a constant value, therefore, the liquid fuel cell unit can be rapidly initialized to an operation state in which it achieves its maximum capability. Also, when an auxiliary power supply unit is installed on the secondary side of the boosting circuit, exhaustion of this auxiliary power supply unit can be suppressed.

Several embodiments according to the present invention will be described in detail below with reference to the accompanying drawings.

(First Embodiment)

A first embodiment of the present invention is based on a hybrid DMFC system which boosts an output voltage from a direct methanol fuel cell (DMFC) unit by a boosting circuit, superposes an output auxiliary voltage from an auxiliary battery on the boosted voltage, and supplies the superposed voltage to an electronic apparatus. A boosting control circuit is additionally installed to compare the output voltage from the DMFC unit with a preset threshold voltage, and control the output voltage from the boosting circuit on the basis of the comparison result. By this control, the output voltage of the DMFC unit does not fall below the threshold voltage.

Figure 1:
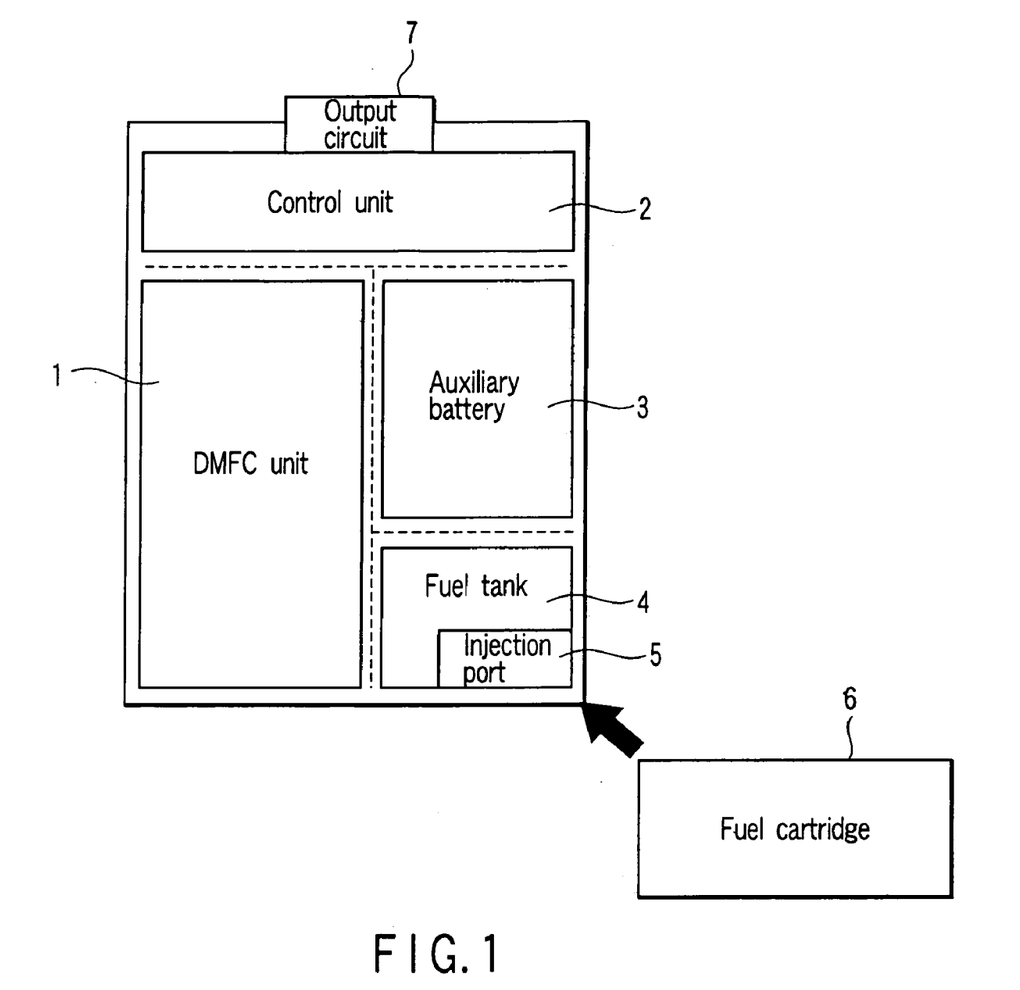
FIG. 1 is a schematic view showing a liquid fuel cell system according to a first embodiment of the present invention.

FIG. 1 is a schematic view showing a direct methanol fuel cell (DMFC) system as the first embodiment of the liquid fuel cell system according to the present invention. This DMFC system contains a DMFC unit 1, control unit 2, auxiliary battery 3, and fuel tank 4 in a housing.

In the DMFC unit 1, an electrolytic membrane is placed between an anode electrode and cathode electrode. Each of these anode electrode and cathode electrode is made up of a collector and catalyst layer. The anode catalyst layer is supplied with an aqueous methanol solution, and generates protons by the catalytic reaction. On the other hand, the cathode electrode is supplied with air. In the cathode electrode, the protons having passed through the catalyst react with the oxygen contained in the supplied air on the catalyst, thereby generating electric power.

The fuel tank 4 contains an aqueous methanol solution as fuel. This aqueous methanol solution is supplied to the anode catalyst layer of the DMFC unit 1 through a supply path (not shown). Also, the fuel tank 4 has an injection port 5. A fuel cartridge is detachably attached to the injection port 5, and fuel is replenished from this fuel cartridge to the fuel tank 4.

The auxiliary battery 3 is a secondary battery. This secondary battery is charged by the output electric power from the DMFC unit 1. The auxiliary battery 3 generates auxiliary electric power for replenishing the deficiency of the output electric power from the DMFC unit 1, in accordance with the load of a portable electronic apparatus 100 as an object of power supply. The generated auxiliary electric power is supplied to the portable electronic apparatus 100.

Figure 2:
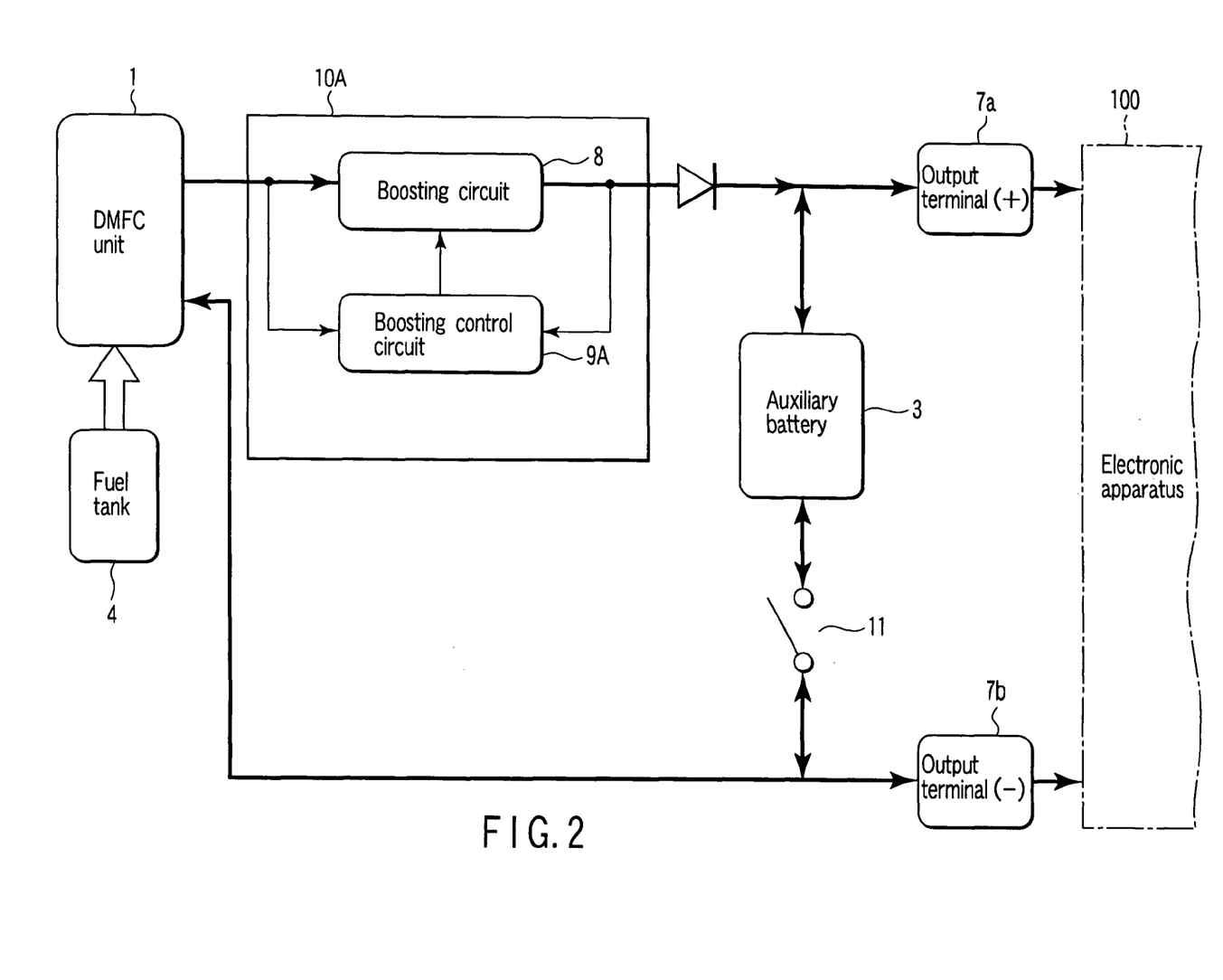
FIG. 2 is a block diagram showing the circuit configuration of the system shown in FIG. 1.

The control unit 2 controls the supply of a power supply voltage to the portable electronic apparatus 100, and has the following arrangement. FIG. 2 is a circuit block diagram mainly showing the arrangement of the control unit 2.

That is, the control unit 2 includes a boosting circuit 8, boosting control circuit 9A, and current voltage monitoring circuit (not shown). Of these circuits, the boosting circuit 8 and boosting control circuit 9A form a boosting unit 10A. The boosting unit 10A is formed on a single circuit board.

Figure 3:
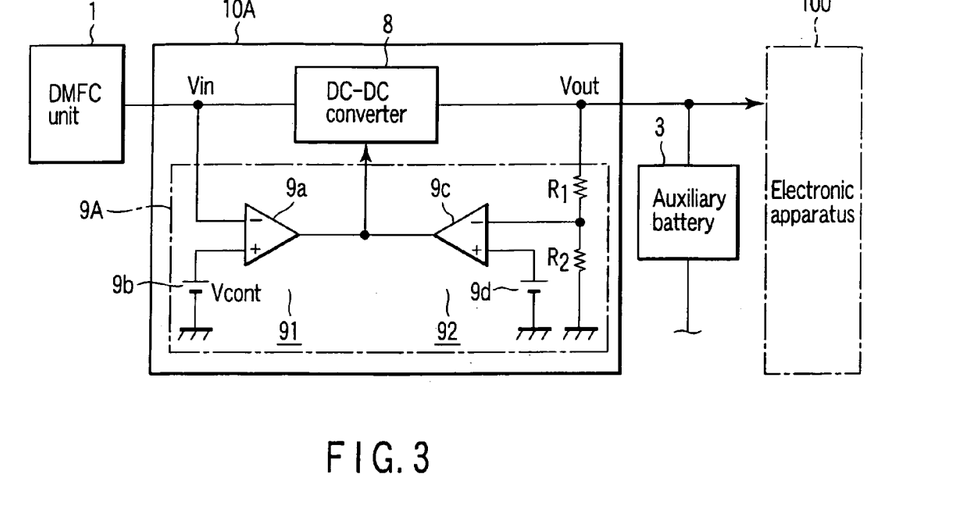
FIG. 3 is a view showing the circuit configuration of a boosting control circuit of the system shown in FIG. 2.

The boosting circuit 8 is formed by, e.g., a DC-DC converter. As shown in FIG. 3, the boosting control circuit 9A is made up of, e.g., first and second control circuits 91 and 92.

The first control circuit 91 is made up of a comparator 9a and threshold voltage power supply 9b. The comparator 9a compares an output voltage from the DMFC unit 1 (an input voltage Vin to the DC-DC converter 8) with a first threshold voltage Vcont generated by the threshold voltage power supply 9b. If Vin<Vcont, the comparator 9a gives a control signal to the DC-DC converter 8, thereby controlling an output voltage Vout. As a consequence, the output voltage Vin of the DMFC unit 1 is optimized.

Figure 4:
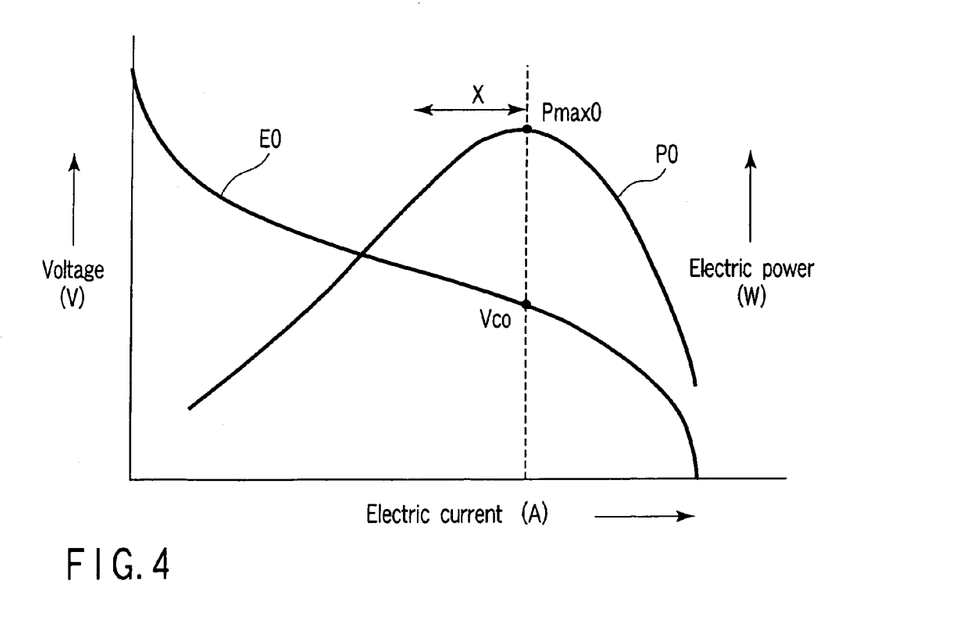
FIG. 4 is a graph showing examples of the output current-voltage characteristic and output current-electric power characteristic of a direct methanol fuel cell.

As shown in FIG. 4, the first threshold voltage Vcont is set at an output voltage value Vc0 of the DMFC unit 1, which is obtained when electric power P0 generated by the DMFC unit 1 shows a peak value Pmax0. Accordingly, the output voltage Vin of the DMFC unit 1 is always held equal to or higher than the first threshold voltage Vcont=Vc0.

The second control circuit 92 is made up of a comparator 9c, a threshold voltage power supply 9d, and resistance voltage dividing circuits R1 and R2. The resistance voltage dividing circuits R1 and R2 divide the output voltage Vout from the DC-DC converter 8, and input the divided voltage to the comparator 9c. The comparator 9c compares the divided voltage value with a second threshold voltage VFB generated by a threshold voltage power supply 9d. The difference signal is given to the DC-DC converter 8, thereby controlling the output voltage Vout from the DC-DC converter 8.

That is, the second control circuit 92 controls the operation of the DC-DC converter 8 such that the output voltage Vout of the DC-DC converter 8 does not exceed the second threshold voltage VFB, while the output voltage Vin of the DMFC unit 1 is held equal to or higher than the first threshold voltage Vcont=Vc0.

The operation of the DMFC system configured as described above will be explained below.

When the DMFC system is to be used as a power supply, a + terminal 7a and − terminal 7b of an output circuit 7 are connected to the power terminal (not shown) of the portable electronic apparatus 100. Consequently, the output voltage Vin from the DMFC unit 1 is boosted to the voltage Vout by the boosting circuit 8, and the voltage Vout is supplied from the + terminal 7a and − terminal 7b of the output circuit 7 to the portable electronic apparatus 100.

If the load of the portable electronic apparatus 100 fluctuates and it is no longer possible to supply the necessary electric power only by the output voltage Vout from the boosting circuit (DC-DC converter) 8, the secondary battery of the auxiliary battery 3 supplies the deficiency to the portable electronic apparatus 100. That is, hybrid power supply is performed for the portable electronic apparatus 100.

If the load of the portable electronic apparatus 100 fluctuates, the output voltage Vin of the DMFC unit 1 drops owing to the original boosting function of the boosting circuit (DC-DC converter) 8, and the DMFC unit 1 shuts down if this voltage drop is left uncontrolled. In the DMFC system according to the first embodiment, however, the first control circuit 91 of the boosting control circuit 9A performs control such that the output voltage Vin of the DMFC unit 1 does not fall below the first threshold voltage Vcont, i.e., the output voltage Vin does not become less than the first threshold voltage Vcont.

Figure 5:
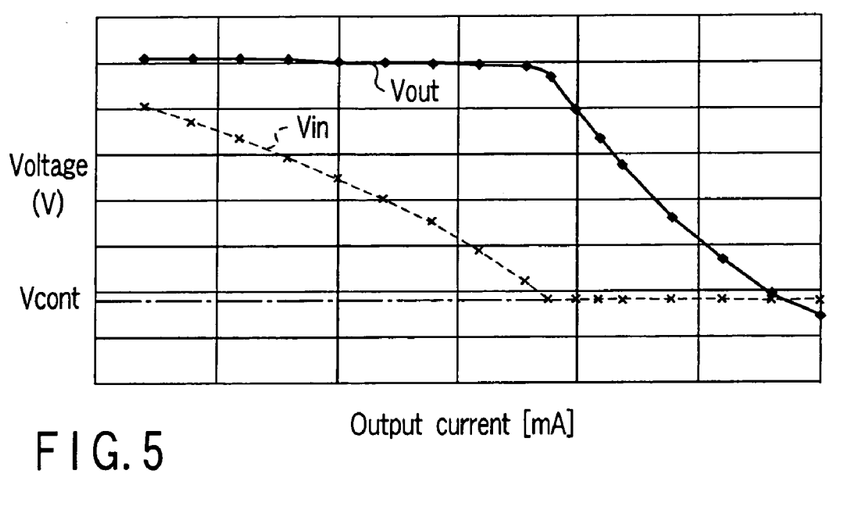
FIG. 5 is a graph showing the output current-voltage characteristics of a boosting circuit of the system shown in FIG. 2.

More specifically, if the output voltage Vin of the DMFC unit 1 is equal to or higher than the first threshold voltage Vcont (Vin>Vcont), the first control circuit 91 of the boosting control circuit 9A does not operate, and as a consequence the DC-DC converter 8 outputs a constant output voltage Vout as shown in FIG. 5.

In contrast, if the output voltage Vin of the DMFC unit 1 further lowers to fall within the range Vin<Vcont, the first control circuit 91 of the boosting control circuit 9A gives a control signal to the DC-DC converter 8. Consequently, as shown in FIG. 5, the output voltage Vout from the DC-DC converter 8 reduces. In this manner, the output voltage Vin from the DMFC unit 1 is so held as not to become less than the first threshold voltage Vcont.

Figure 6:
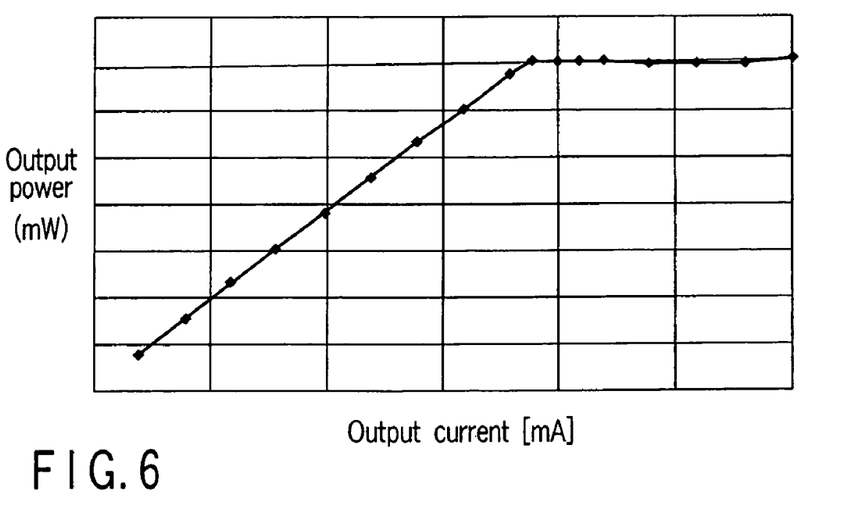
FIG. 6 is a graph showing the output current-output power characteristic of the boosting circuit of the system shown in FIG. 2.

Accordingly, as shown in FIG. 4, the DMFC unit 1 drives within a region X from the vicinity of the peak value Pmax0 of the output power P0, where an output voltage E0 is high. Therefore, the operation state of the DMFC unit 1 always maintains a state close to the maximum efficiency regardless of the fluctuation in load of the portable electronic apparatus 100. FIG. 6 is a graph showing the output current-output power characteristic of the DC-DC converter 8, which corresponds to the output current-voltage characteristic shown in FIG. 5.

Note that if the voltage value of the auxiliary battery 3 is lower than a voltage value obtained when the auxiliary battery 3 is fully charged, the supplied voltage to the portable electronic apparatus 100 depends on the output voltage Vin from the DMFC unit 1 instead of the output voltage Vout from the DC-DC converter 8.

In the first embodiment as described above, the first control circuit 91 of the boosting control circuit 9A compares the output voltage Vin from the DMFC unit 1 with the preset first threshold voltage Vcont. If Vin<Vcont, the output voltage Vout from the DC-DC converter 8 is so controlled that the output voltage Vin from the DMFC unit 1 does not become less than the first threshold voltage Vcont.

Accordingly, even if the output voltage Vin from the DMFC unit 1 lowers owing to the influence of the load fluctuation of the portable electronic apparatus 100, the output voltage Vin from the DMFC unit 1 is always held equal to or higher than the first threshold voltage Vcont. This prevents the inconvenience that the DMFC unit 1 shuts down owing to the influence of the fluctuation in load of the portable electronic apparatus 100. This makes it possible to stably supply electric power to the portable electronic apparatus 100, and hold a high power generation efficiency.

Note that when the auxiliary battery 3 is installed on the secondary side of the boosting circuit 8 as in the DMFC system according to the first embodiment, the internal resistance of the auxiliary battery 3 is low, so the efficiency of the boosting circuit 8 decreases because the output voltage from the boosting circuit 8 is pulled by the output voltage from the auxiliary battery 3.

To solve this problem, a fixed voltage generation circuit is installed in the control unit 2. This fixed voltage generation circuit generates a fixed voltage on the basis of the voltage value of the auxiliary battery 3, and feeds the generated fixed voltage back to the boosting circuit 8, thereby controlling the output voltage Vout from the boosting circuit 8. With this arrangement, the boosting circuit 8 can perform a boosting operation regardless of the influence of the voltage value of the auxiliary battery 3, so the boosting circuit 8 can maintain a high efficiency.

(Second Embodiment)

A second embodiment of the present invention is a system which compares an output voltage from a DMFC unit with a threshold voltage by a boosting control circuit, and controls the output voltage from the boosting unit described above on the basis of the comparison result. In this system, the temperature of the DMFC unit is detected, and the threshold voltage of the boosting control circuit is variably controlled in accordance with the detected temperature.

More specifically, the threshold voltage is so set as to have a voltage value corresponding to the peak value of electric power generated by the DMFC unit in accordance with the temperature at that time.

Figure 7:
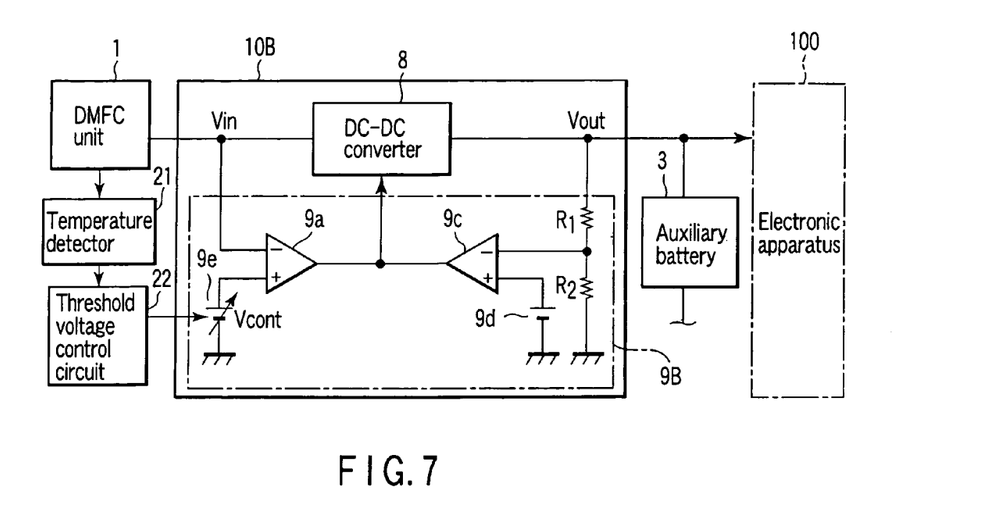
FIG. 7 is a view showing the circuit configurations of a boosting control circuit and threshold voltage control circuit of a liquid fuel cell system according to a second embodiment of the present invention.

FIG. 7 is a circuit block diagram showing the arrangement of a control unit of the DMFC system according to the second embodiment of the present invention. Note that the same reference numerals as in FIG. 3 denote the same parts in FIG. 7, and a detailed explanation thereof will be omitted.

In a boosting control circuit 9B, a threshold voltage power supply 9e which generates a first threshold voltage Vcont is a variable power supply circuit capable of varying the output voltage in accordance with an external control signal.

Also, a temperature detector 21 is installed in a position close to a DMFC unit 1. In addition, a control unit 2 has a threshold voltage control circuit 22. The temperature detector 21 uses, e.g., a thermistor, and inputs a voltage value corresponding to the temperature of the DMFC unit 1 as a temperature detection signal to the threshold voltage control circuit 22.

The threshold voltage control circuit 22 has a threshold voltage table. This threshold voltage table stores, in relation to each individual temperature, correction data of an optimum threshold voltage Vcont of the temperature. The threshold voltage control circuit 22 reads, from the threshold voltage table, correction data of a threshold voltage corresponding to the voltage value of the temperature detection signal supplied from the temperature detector 21. The read threshold voltage correction data is given to the threshold voltage power supply 9e of the boosting control circuit 9B. In this manner, an optimum first threshold voltage Vcont corresponding to the detected temperature is generated from the threshold voltage power supply 9e.

Figure 8:
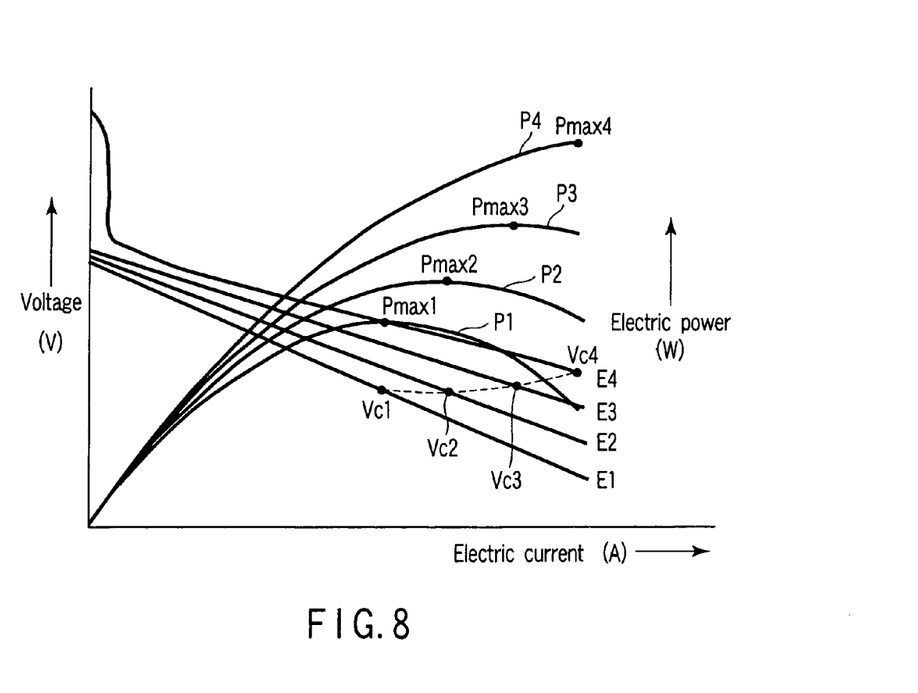
FIG. 8 is a graph showing examples of the output current-voltage characteristics and output current-electric power characteristics of a direct methanol fuel cell when the temperature is used as a parameter.

For example, if the output current-voltage characteristics and output current-output power characteristics of the DMFC unit 1 when the temperature is a parameter are as shown in FIG. 8, output voltage values Vc1, Vc2, Vc3, and Vc4 corresponding to peak values Pmax1, Pmax2, Pmax3, and Pmax4 of output power characteristics P1, P2, P3, and P4, respectively, are stored as threshold voltages Vcont in the threshold voltage table for the individual temperatures.

An output voltage value corresponding to the temperature detected by the temperature detector 21, e.g., the output voltage value Vc3, is read from the threshold voltage table, and the read output voltage value Vc3 is given as correction data to the threshold voltage power supply 9e of the boosting control circuit 9B. As a consequence, the threshold voltage Vcont of the threshold voltage power supply 9e is set at the output voltage value Vc3, and an output voltage Vin from the DMFC unit 1 is so controlled as not to become less than the output voltage value Vc3 after that.

After that, an optimum voltage value corresponding to the present temperature of the DMFC unit 1 is set as the threshold voltage Vcont in the threshold voltage power supply 9e. The output voltage Vin from the DMFC unit 1 is so controlled as not to fall below the set threshold voltage Vcont.

In the second embodiment as described above, the temperature of the DMFC unit 1 is detected by the temperature detector 21, and an optimum voltage value corresponding to the detected temperature, i.e., an output voltage value corresponding to the peak value of the output power from the DMFC unit 1 is set as the threshold voltage Vcont in the threshold voltage power supply 9e. Accordingly, an optimum threshold voltage Vcont can be variably set whenever the temperature of the DMFC unit 1 changes. When compared to a case in which the threshold voltage Vcont is fixed to a constant value, therefore, it is possible to rapidly initialize the operation state of the DMFC unit 1 to the maximum efficiency state, and suppress exhaustion of a secondary battery of an auxiliary battery 3.

(Third Embodiment)

Figure 9:
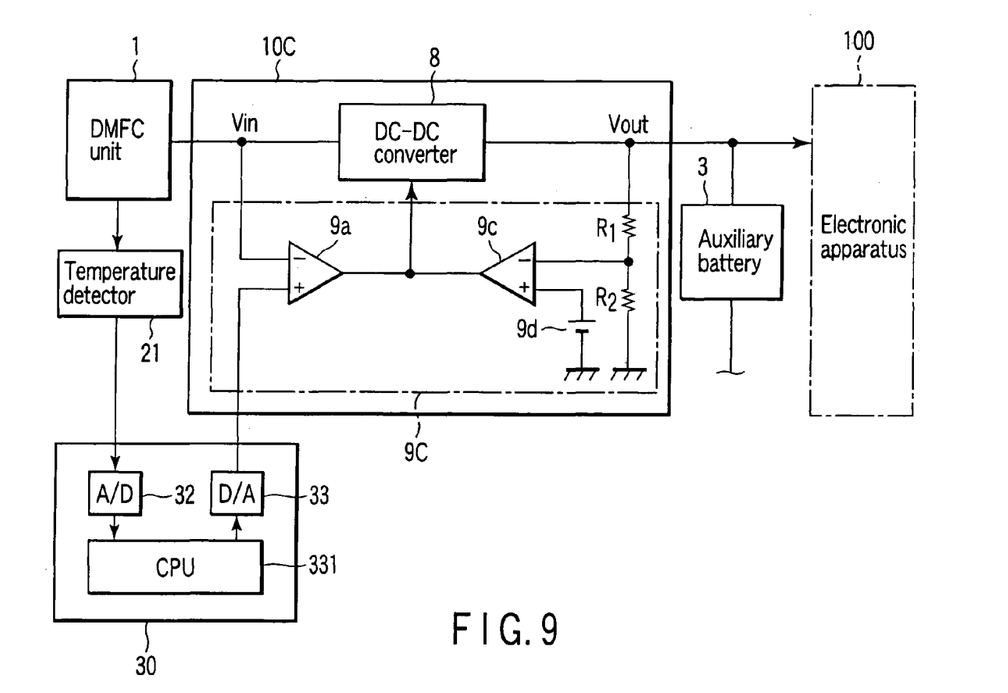
FIG. 9 is a view showing the circuit configurations of a boosting control circuit and control unit of a liquid fuel cell system according to a third embodiment of the present invention.

In a third embodiment of the present invention, when a control unit 2 includes an arithmetic unit which operates by software like a microcomputer, computation is performed on the basis of the temperature of a DMFC unit 1, which is detected by a temperature detector 21, thereby calculating an optimum threshold voltage value corresponding to the detected temperature. A calculated threshold voltage value Vcont is generated and input to a comparator 9a of a boosting control circuit.

FIG. 9 is a circuit block diagram showing the arrangement of a control unit of a DMFC system according to the third embodiment of the present invention. Note that the same reference numerals as in FIG. 7 denote the same parts in FIG. 9, and a detailed explanation thereof will be omitted.

The control unit 2 of this embodiment includes a microcomputer 30. The microcomputer 30 includes a CPU 31, analog-to-digital converter (A/D) 32, and digital-to-analog converter (D/A) 33.

The analog-to-digital converter 32 converts an analog temperature detection signal output from the temperature detector 21 into digital data, and gives this data to the CPU 31. In accordance with a program stored in a memory (not shown), the CPU 31 executes processing for calculating an optimum threshold voltage value Vcont corresponding to the detected temperature. An arithmetic expression herein used is represented as a function between the temperature and optimum threshold voltage value, and prepared beforehand on the basis of the characteristic indicated by the broken line in FIG. 8.

The D/A 33 converts digital data of the optimum threshold voltage value Vcont calculated by the CPU 31 into an analog voltage, and inputs the converted analog voltage to the comparator 9a of a boosting control circuit 9C.

Since the configuration is as described above, the temperature of the DMFC unit 1 is detected by the temperature detector 21, converted into digital data by the analog-to-digital converter 32, and input to the CPU 31. The CPU 31 calculates an optimum threshold voltage value on the basis of the input digital data of the detected temperature. The calculated optimum threshold voltage value is input to the comparator 9a of the boosting control circuit 9C after being converted from the digital data into the analog voltage value Vcont by the digital-to-analog converter 33.

Accordingly, an optimum threshold voltage Vcont corresponding to the present temperature of the DMFC unit 1 is input to the comparator 9a of the boosting control circuit 9C. When compared to a case in which the threshold voltage Vcont is fixed to a constant value, therefore, as in the second embodiment, it is possible to rapidly initialize the operation state of the DMFC unit 1 to the maximum efficiency state, and suppress exhaustion of a secondary battery of an auxiliary battery 3.

Also, the optimum threshold voltage value calculated by the CPU 31 is input to the comparator 9a after being converted into the analog voltage value Vcont by the digital-to-analog converter 33. This makes it possible to eliminate the threshold voltage power supply 9e from the boosting control circuit 9C, simplify the circuit configuration of the boosting control circuit 9C accordingly, and decrease the circuit scale.

Note that in the above explanation, an arithmetic expression is used to calculate an optimum threshold voltage Vcont corresponding to the detected temperature. However, as in the second embodiment, it is also possible to form a threshold voltage table showing the correspondence of the detected temperature to the optimum threshold voltage Vcont, and prestore the table in an internal memory of the microcomputer 30. In this case, optimum threshold voltage data corresponding to detected temperature data is read from this threshold voltage table, and the read optimum threshold voltage data is input to the comparator 9a after being converted into the analog voltage value Vcont by the digital-to-analog converter 33.

(Other Embodiments)

In each embodiment described above, the output voltage Vin from the DMFC unit 1 is compared with the preset threshold voltage Vcont, and the output voltage Vout from the DC-DC converter 8 is controlled on the basis of the comparison result, so that the output voltage Vin from the DMFC unit 1 does not fall below the threshold voltage Vcont. However, it is also possible to control the boosting operation of the DC-DC converter 8 on the basis of the comparison result, such that the output voltage Vin from the DMFC unit 1 is always held equal to or higher than the threshold voltage Vcont.

In each embodiment described above, a current limiting circuit may also be connected in series with the auxiliary battery 3. In this case, if the output current from the DC-DC converter 8 increases to almost exceed a preset upper limit in accordance with the load fluctuation of the portable electronic apparatus 100, this output current value is limited below the upper limit. This makes it possible to protect the secondary battery of the auxiliary battery 3 against an overcurrent.

Also, in the second embodiment, the control data of the output voltage values Vc1, Vc2, Vc3, and Vc4 corresponding to four temperatures is stored in the threshold voltage table. However, output voltage values corresponding to five or more temperatures may also be stored in the threshold voltage table by increasing the temperature sampling amount. In contrast, it is also possible to store only output voltage values corresponding to two or three temperatures in the threshold voltage table.

Furthermore, if an output voltage value corresponding to the temperature detected by the temperature detector 21 is not stored in the threshold voltage table, it is possible to approximate the detected temperature, and read an output voltage value corresponding to the approximated temperature from the threshold voltage table.

On the other hand, as another means, it is also possible to read a plurality of output voltage values close to the detected temperature from the threshold voltage table, and calculate an output voltage value corresponding to the detected temperature by interpolation on the basis of the read output voltage values. In this case, control data of the calculated output voltage value is given to the threshold voltage power supply 9e.

In the second and third embodiments, the temperature detector 21 and the threshold value control circuit 22 or microcomputer 30 are installed separately from the boosting units 10B and 10C. However, the temperature detector 21 and the threshold value control circuit 22 or microcomputer 30 may also be installed in the boosting units 10B and 10C. This makes it possible to integrate all the peripheral circuits of the DMFC unit 1 into one chip as an LSI, thereby further downsizing the DMFC system.

In the above embodiments, the first threshold value Vcont is set at the output voltage value Vc0 from the DMFC unit 1, which is obtained when the electric power P0 generated by the DMFC unit 1 shows the peak value Pmax0. However, the first threshold value Vcont need not always be set at the output voltage value Vc0, and can be set at any value between the output voltage value Vc0 and a value equivalent to 70% of the output voltage value Vc0.

Furthermore, each embodiment is explained by taking a DMFC system using methanol as fuel as an example. As liquid fuel, however, it is also possible to use an aqueous solution of, e.g., ethanol, diethyl ether, dimethoxymethane, formaldehyde, formic acid, methyl formate, methyl orthoformate, trioxane, 1-propanol, 2-propanol, 3-propanol, ethyleneglycol, glyoxal, or glycerin, and an aqueous solution of a compound of any of these chemical substances may also be used.

Moreover, the circuit configurations of the boosting circuit and boosting control circuit, the value of the first threshold voltage Vcont, the presence/absence of the auxiliary battery, the system configuration, and the like can be variously modified without departing from the spirit and scope of the present invention.

In conclusion, the present invention is not directly limited to the above embodiments, but can be implemented when practiced by modifying the constituent elements without departing from the spirit and scope of the invention. Also, various inventions can be formed by appropriately combining a plurality of constituent elements disclosed in the above embodiments. For example, some constituent elements may also be omitted from all the constituent elements disclosed in each embodiment. Furthermore, constituent elements of different embodiments may also be appropriately combined.

The liquid fuel cell system and its boosting unit according to the present invention can always supply stable electric power and hold a high power generation efficiency against load fluctuations. Accordingly, the present invention can be effectively used as a power supply of an electronic apparatus having a load which fluctuates with time, particularly, a notebook personal computer, PDA, cellphone, portable television receiver, video/audio player, or portable game machine.

What is claimed is:

1. A liquid fuel cell system which supplies a power supply voltage to an electronic apparatus having a load which fluctuates with time, comprising:
a liquid fuel cell unit which outputs a first voltage;
a boosting circuit which boosts the first voltage output from the liquid fuel cell unit, and outputs a boosted second voltage to the electronic apparatus;
a first control circuit which compares the first voltage output from the liquid fuel cell unit with a preset first threshold voltage, and controls an operation of the boosting circuit in accordance with a comparison result such that the first voltage does not fall below the first threshold voltage or the first voltage does not hold less than the first threshold voltage; and
a second control circuit which, when the first voltage is kept not less than the first threshold voltage, compares the boosted second voltage output by the boosting circuit with a preset second threshold voltage, and controls the boosting circuit in accordance with a comparison result such that the second voltage does not exceed the second threshold voltage.

2. The liquid fuel cell system according to claim 1, wherein the first control circuit incorporates a circuit which generates the first threshold voltage.

3. The liquid fuel cell system according to claim 1, further comprising a threshold voltage generation circuit configured to be installed independently of the first control circuit, the threshold voltage generation circuit is configured to generate the first threshold voltage and give the generated first threshold voltage to the first control circuit.

4. The liquid fuel cell system according to claim 1, in which the first control circuit incorporates a variable voltage generation circuit which generates the first threshold voltage, and
which further includes a circuit which gives a control signal for designating a value of the first threshold voltage to the variable voltage generation circuit, and variably controls the value of the first threshold voltage generated by the variable voltage generation circuit.

5. The liquid fuel cell system according to claim 1, wherein the first threshold voltage is set at a value between a first voltage value obtained when electric power generated by the liquid fuel cell unit shows a peak value and a value equivalent to 70% of the first voltage value.

6. The liquid fuel cell system according to claim 1, further comprising a correction circuit which detects a temperature of the liquid fuel cell unit, and corrects the first threshold voltage in accordance with the detected temperature.

7. A boosting unit of a liquid fuel cell system, the boosting unit being installed between a liquid fuel cell unit and an electronic apparatus having a load which fluctuates with time, comprising:
a boosting circuit which boosts a first voltage output from the liquid fuel cell unit, and outputs a boosted second voltage to the electronic apparatus; and
a first control circuit which compares the first voltage output from the liquid fuel cell unit with a preset first threshold voltage, and controls an operation of the boosting circuit in accordance with a comparison result such that the first voltage does not fall below the first threshold voltage or the first voltage does not hold less than the first threshold voltage; and
a second control circuit which, when the first voltage is kept not less than the first threshold voltage, compares the boosted second voltage output by the boosting circuit with a preset second threshold voltage, and controls the boosting circuit in accordance with a comparison result such that the second voltage does not exceed the second threshold voltage.

8. The boosting unit of a liquid fuel cell system according to claim 7, wherein the first control circuit incorporates a circuit which generates the first threshold voltage.

9. The boosting unit of a liquid fuel cell system according to claim 7, further comprising a threshold voltage generation circuit configured to be installed independently of the first control circuit, the threshold voltage generation circuit is configured to generate the first threshold voltage and give the generated first threshold voltage to the first control circuit.

10. The boosting unit of a liquid fuel cell system according to claim 7, in which the first control circuit incorporates a variable voltage generation circuit which generates the first threshold voltage, and
which further includes a circuit which gives a control signal for designating a value of the first threshold voltage to the variable voltage generation circuit, and variably controls the value of the first threshold voltage generated by the variable voltage generation circuit.

11. The boosting unit of a liquid fuel cell system according to claim 7, wherein the first threshold voltage is set at a value between a first voltage value obtained when electric power generated by the liquid fuel cell unit shows a peak value and a value equivalent to 70% of the first voltage value.

12. The boosting unit of a liquid fuel cell system according to claim 7, further comprising a correction circuit which detects a temperature of the liquid fuel cell unit, and corrects the first threshold voltage in accordance with the detected temperature.

* * * * *